United States Patent
Stern

(10) Patent No.: US 8,310,366 B2
(45) Date of Patent: Nov. 13, 2012

(54) RFID DEVICE AND RELATED METHOD FOR PROVIDING ASSISTANCE FOR LOCATING IT

(75) Inventor: Miklos Stern, Woodmere, NY (US)

(73) Assignee: Symbol Technologies, Inc., Holtsville, NY (US)

(*) Notice: Subject to any disclaimer, the term of this patent is extended or adjusted under 35 U.S.C. 154(b) by 994 days.

(21) Appl. No.: 12/338,230

(22) Filed: Dec. 18, 2008

(65) Prior Publication Data

US 2010/0156650 A1 Jun. 24, 2010

(51) Int. Cl.
*G08B 21/18* (2006.01)
*H04Q 5/22* (2006.01)

(52) U.S. Cl. ........... 340/572.1; 340/636.1; 340/636.11; 340/636.12; 340/636.13; 340/636.14; 340/636.15; 340/636.16; 340/636.17; 340/636.18; 340/636.19

(58) Field of Classification Search ........................ None
See application file for complete search history.

(56) References Cited

U.S. PATENT DOCUMENTS

| | | | |
|---|---|---|---|
| 7,907,060 B2* | 3/2011 | Reams | 340/636.15 |
| 8,044,800 B2* | 10/2011 | Osada | 340/572.1 |
| 2002/0128051 A1* | 9/2002 | Liebenow | 455/574 |
| 2003/0227390 A1* | 12/2003 | Hung et al. | 340/636.1 |
| 2005/0168338 A1* | 8/2005 | Parker et al. | 340/539.32 |
| 2005/0200204 A1* | 9/2005 | Jonsson et al. | 307/10.3 |
| 2005/0264427 A1* | 12/2005 | Zeng et al. | 340/635 |
| 2006/0145815 A1* | 7/2006 | Lanzieri et al. | 340/10.2 |
| 2007/0182576 A1* | 8/2007 | Proska et al. | 340/636.1 |
| 2008/0136647 A1* | 6/2008 | Brown | 340/572.8 |
| 2008/0231449 A1* | 9/2008 | Moshfeghi | 340/572.1 |
| 2008/0312852 A1* | 12/2008 | Maack | 702/63 |
| 2009/0200374 A1* | 8/2009 | Jentoft | 235/382 |
| 2009/0219152 A1* | 9/2009 | Angelo et al. | 340/540 |
| 2009/0278701 A1* | 11/2009 | Reams | 340/636.15 |
| 2010/0007495 A1* | 1/2010 | Hanebeck | 340/572.1 |
| 2010/0013639 A1* | 1/2010 | Revert | 340/572.1 |
| 2010/0060467 A1* | 3/2010 | Kofford | 340/636.15 |
| 2010/0156597 A1* | 6/2010 | Stern et al. | 340/5.92 |
| 2010/0332233 A1* | 12/2010 | Chen et al. | 704/270 |
| 2011/0037603 A1* | 2/2011 | Egawa | 340/636.1 |

* cited by examiner

*Primary Examiner* — Benjamin C Lee
*Assistant Examiner* — Rajsheed Black-Childress
(74) *Attorney, Agent, or Firm* — Bartholomew DiVita; Kenneth A. Haas

(57) ABSTRACT

A method of providing assistance for locating a radio-frequency identification (RFID) device is provided. The RFID device preferably comprises a power source having a power level and a feedback device. The method comprises determining the power level of the power source is below a first predetermined power level, and transmitting a first signal that indicates the power level of the power source is below the first predetermined power level. Thereafter, the method comprises receiving a second signal that instructs the RFID device to activate the feedback device, and operating the feedback device in response to receiving the second signal.

16 Claims, 2 Drawing Sheets

RFID DEVICE AND RELATED METHOD FOR PROVIDING ASSISTANCE FOR LOCATING IT

TECHNICAL FIELD

Embodiments of the subject matter described herein relate generally to radio-frequency identification (RFID) information exchange. More particularly, embodiments of the subject matter relate to locating a previously positioned RFID reader.

BACKGROUND

Inventory tracking is useful for retail sales operations for a variety of purposes, including sales estimates, merchandise ordering, and loss prevention. RFID systems, wherein individual items are affixed with an RFID tag are widely used in anti-theft programs. Tracking of each individual RFID tag for purposes of inventory control can also be accomplished. Such tracking, however, requires that a plurality of RFID readers be distributed throughout the store or other sales environment to interrogate and capture information from each RFID tag.

Preferably, the RFID readers are interchangeable and portable to facilitate placement in the diverse layouts and arrangements used by retail sales operations. Interchangeable RFID are often designed to be easily placed and moved, thereby permitting customization of tracking system coverage for each individual installation. Unfortunately, however, because the RFID readers are easily exchanged, it can be difficult to accurately track the identity and location of each RFID reader used in the system. Additionally, RFID readers can often be placed and not later handled for prolonged periods of time, making it unlikely a system operator will remember the location of each RFID reader.

Over the lifetime of such an RFID inventory tracking system, an individual RFID reader will typically require maintenance, such as battery replacement. When an individual RFID reader requires maintenance, it can be difficult to locate which RFID reader should be serviced. After moving RFID readers or because of prolonged use since installation, having information locating the specific RFID reader is unlikely. Accordingly, it can be time-consuming to examine each RFID reader to determine if it requires maintenance, and even then, some RFID readers can be overlooked, as it is preferably to place them unobtrusively.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
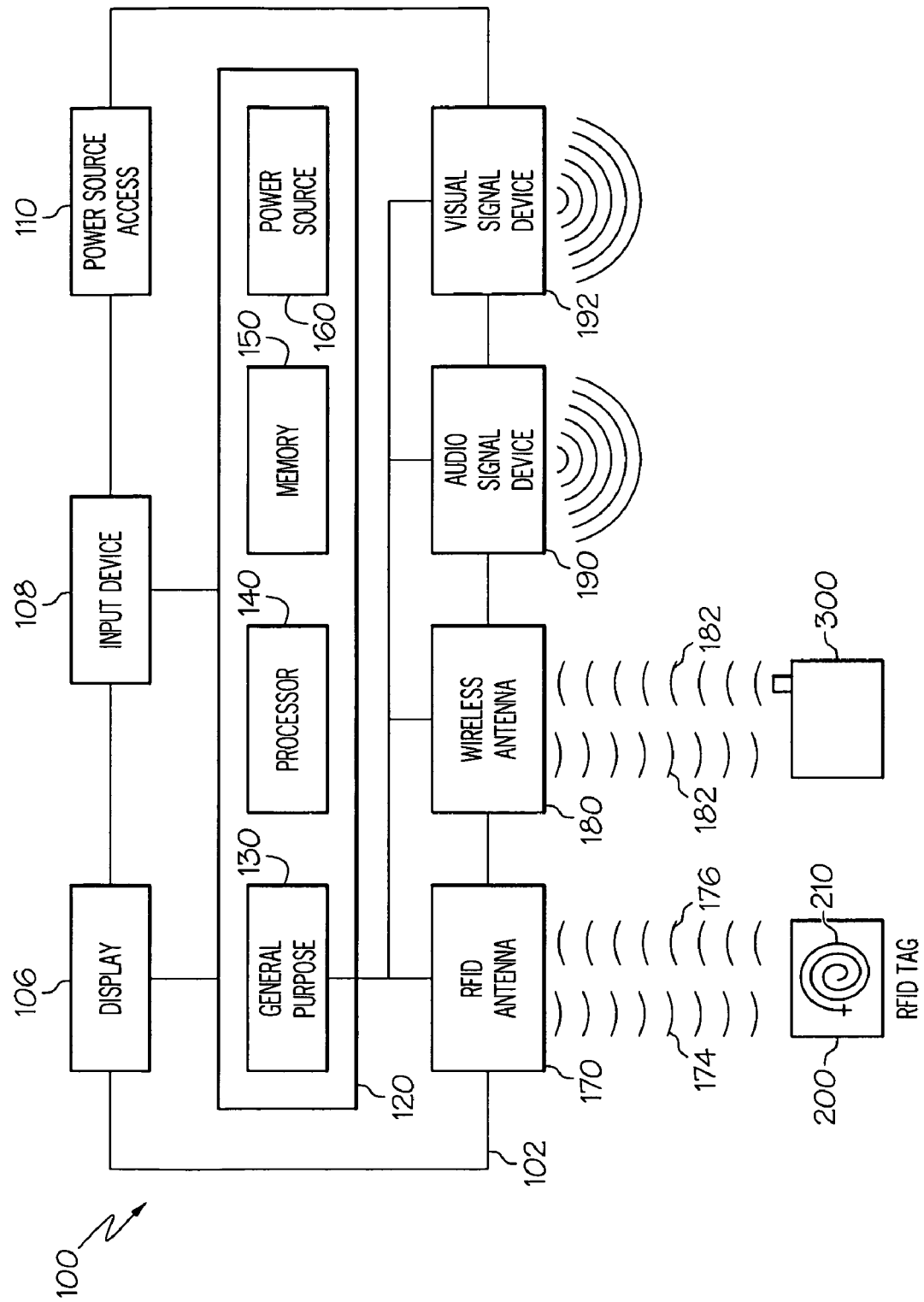
FIG. 1 is schematic diagram of an embodiment of an RFID reader, a nearby RFID tag, and a computing system.

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, communication elements, feedback elements, or the like, which may carry out a variety of functions under the control of one or more microprocessors or other control devices. In addition, those skilled in the art will appreciate that embodiments of the present invention may be practiced in conjunction with any number of data transmission protocols and that the system described herein is merely one example embodiment of the invention.

For the sake of brevity, conventional techniques related to radio-frequency identification (RFID) data transmission, RFID system architectures, computing device architectures, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

The following description may refer to elements or nodes or features being "coupled" together. Unless expressly stated otherwise, "coupled" means that one element/node/feature is directly or indirectly joined to (or directly or indirectly communicates with) another element/node/feature, and not necessarily mechanically. For example, although the schematic shown in FIG. 1 depicts one example arrangement of elements such as electronic components, additional intervening elements, devices, features, or components may be present in an embodiment of the invention.

Briefly, the techniques and technologies described herein leverage the use of RFID tags for tracking and location purposes. Other applications of the methods and systems disclosed herein are also possible. A user may use an off-the-shelf RFID reader, whether or not the reader is operatively coupled to a personal computer (PC), a tablet computer, mobile computing device, such as a personal data assistant (PDA), or the like. Such a computer or computing device can run one or more suitably configured software applications.

In accordance with the exemplary embodiments described herein, a user of an inventory tracking system using distributed RFID devices can operate components of the system to assist in locating a RFID device in need of maintenance. During a routine communication between the RFID device and a central computing system, the RFID device can communicate a need for maintenance along with any information normally transmitted. In response, a user of the system, through the central computing system, can instruct the RFID device to activate a feedback device. The feedback device, a component of the RFID device, can produce an audible and/or visual signal readily apparent to the user. Thus, the user can more easily locate the specific RFID device requiring maintenance among the plurality of distributed RFID devices.

FIG. 1 is a schematic representation of a portion of a distributed RFID system 50. The system 50 comprises at least one RFID reader 100, which is configured in accordance with an exemplary embodiment, communicating with a central computing system 300. The system 50 can comprise additional RFID devices, of any number having the same or differing features, as appropriate to the embodiment. An exemplary RFID tag 200 is also shown. The RFID reader 100 is depicted in an oversimplified manner, and a practical embodiment can include many additional features and components. The RFID reader 100 generally includes a housing 102, a display element 106 that is visible from the outside of the housing 102, an input device 108 that is accessible from the outside of the housing 102, a mechanism for power source access 110 which provides access through the housing 102, an electronics module 120 contained within the housing 102, an RFID antenna 170 (which can be, but is not necessarily, contained within the housing 102), a wireless antenna 180, an audio signal device 190, and a visual signal device 192. The input device 108 is preferably a keypad, though the RFID reader 100 can also include a touch panel or other input/output elements. Certain embodiments of the RFID reader 100 can omit the display element 106 and/or input device 108.

The display element 106 and input device 108 function as input/output elements for the operator of the RFID reader 100. The display element 106 and input device 108 can be coupled to the electronics module 120 as necessary to support input/output functions in a conventional manner.

The electronics module 120 represents the hardware components, logical components, and software functionality of the RFID reader 100. In practical embodiments, the electronics module 120 can be physically realized as an integrated component, board, card, or package mounted within the housing 102. As depicted in FIG. 1, the electronics module 120 can be coupled to the RFID antenna 170 and the wireless antenna 180 using suitable techniques. As one example, the electronics module 120 and the RFID antenna 170 can be connected via an RF cable and RF connector assemblies.

The electronics module 120 may generally include a number of sub-modules, features, and components configured to support the functions described herein. For example, the electronics module 120 may include a general purpose sub-module 130, at least one processor 140, memory 150, and a power source 160. The distinct functional blocks of FIG. 1 are useful for purposes of description. In a practical embodiment, the various sub-modules and functions need not be distinct physical or distinct functional elements. In other words, these (and other) functional modules of the RFID reader 100 may be realized as combined processing logic, a single application program, or the like.

The general purpose sub-module 130 is responsible for handling functions of the RFID reader 100, as needed. For example, the general purpose sub-module 130 can include a wireless data communication element that supports bi-directional wireless data transfer using the wireless antenna 180 with suitable wireless data transmission protocols and methodologies, such as the IEEE 802.11x family of protocols, the BLUETOOTH™ protocol, the IEEE 802.15.4 protocol, or other wireless communication techniques desirable for, or appropriate to, the embodiment. In such a deployment, the RFID antenna 170 may be tuned to avoid RF interference with the wireless data communication elements. Alternatively (or additionally), the general purpose sub-module 130 can be configured to support data communication over physical connections. The general purpose sub-module 130 can also operate other components, such as the audio and visual signal devices 190, 192, as well as the RFID antenna 170.

As another example, the general purpose sub-module 130 can be configured to support data capture functions of RFID reader 100, where such data capture functions include one or more of: RFID tag interrogation, bar code reading; imaging; magnetic stripe reading; GPS data receiving; and IrDA. These data capture modes can be utilized to support the described uses of the RFID reader 100. Although not separately depicted in FIG. 1, the RFID reader 100 may include a data capture sub-module that is configured to support such data capture modes. Of course, the RFID antenna 170 may also be tuned to avoid RF interference with the data capture sub-module.

The processor 140 can be any general purpose microprocessor, controller, or microcontroller that is suitably configured to control the operation of the RFID reader 100. In practice, the processor 140 executes one or more software applications that provide the desired functionality for the RFID reader 100, including the operating features described in more detail below. The memory 150 may be realized as any processor-readable medium, including, but not limited to, an electronic circuit, a semiconductor memory device, a ROM, a flash memory, an erasable ROM, a floppy diskette, a CD-ROM, an optical disk, a hard disk, an organic memory element, or the like. As an example, the memory 150 is capable of storing RFID data captured by the RFID reader 100, as well as information regarding the RFID reader, such as the power level of the power source 160.

The power source 160 can be any component capable of providing electrical power to the various components of the RFID reader 100. One example of such a power source 160 is a battery, such as a nickel-hydride battery, a lithium-ion battery, whether rechargeable or not. In some embodiments, a fuel cell can be used, and depletion of the available fuel can cause a loss of power. Preferably, the power source 160 is coupled to the electronics module 120 not only to provide power, but also to permit the electronics module 120 to monitor the level of power remaining in the power source 160. For example, the electronics module 120 can determine that the power source 160 has an amount of power remaining related as a percentage of the overall capacity of the power source 160. Thus, in some embodiments, the electronics module 120 could determine that the power source 160 has 75% of its capacity remaining for use. For example, where a fuel cell is present, the remaining fuel could be expressed as the power level. Such information can be made available to users of the RFID reader 100, such as through presentation on the display 106 or through transmission as data via the wireless antenna 180.

The electronics module 120, as well as other components of the RFID reader 100, receive power from the power source 160 and can monitor the power source 160 for a power level indicative of the power remaining in the power source 160. The power source 160 can have a finite power capacity. In certain embodiments, the power source 160 can be replenished by power-supplying subcomponents, such as photovoltaic cells during normal operation. After prolonged operation, however, the power level will decrease and, eventually, decrease below a predetermined level. The predetermined power level can be selected by the user of the system 50 at any level desired. In certain embodiments, the predetermined power level can be 40% of the capacity of the power source 160, while in other embodiments, the predetermined power level can be as little as 10% of the capacity. Any other desired level can be configured by the user.

The RFID antenna 170 is capable of transmitting a RFID interrogation signal 174. Although described as a RFID antenna for clarity, the RFID antenna can be actually embodied by a number of subcomponents, such as a radio transceiver, integrated circuit, structural antenna, and any of a variety of other devices useful for performing RFID operations. When reference is made to the RFID antenna 170 or a RFID transceiver, it is to be understood that any combination of subcomponents is included, sufficient to enable the RFID antenna 170 to perform the operations described.

The operation of RFID interrogation and response is generally known and, therefore, will not be described in detail herein. The exemplary RFID tag 200 can be positioned within transmission range of the RFID reader 100. Accordingly, the RFID tag 200 can receive the interrogation signal 174 with its RFID antenna 210. An integrated circuit within the RFID tag 200 can perform one or more operations in response, including modulating the interrogation signal 174. After modulation, a response signal 176 can be transmitted from tag 200 with its RFID antenna 210. The RFID reader 100 can receive the response signal 176, and extract useful information from it, as conveyed by the RFID tag 200. Such useful information can include, but is not limited to, the identity of the tag 200, such as a unique identifier, including a serial number.

The wireless antenna 180 can be any antenna capable of transmitting and receiving information using radio signals. For example, the wireless antenna 180 can be one which operates in signal bands used by wireless communication between computing systems. One example of such wireless communication can performed using the 802.11x family of communication protocols. Thus, the wireless antenna 180 can permit the RFID reader 100 to participate in local area networks (LANs) with other computing devices. As described above with reference to the RFID antenna 170, the wireless antenna 180 is actually a transceiver, a structural, passive antenna, an integrated circuit, as well as any number of other subcomponents properly coupled and configured to produce the functions described. Thus, where reference is made to the wireless antenna 180 or other wireless transceiver, it is intended that the assembly capable to perform the operations described be understood.

In certain embodiments, the RFID reader 100 can operate the wireless antenna 180 to transmit information received from the RFID antenna 170, such as a list of RFID tags within its operational range. The wireless antenna 180 can also be used to receive information, including instructions to be performed by the electronics module 120 or other components of the RFID reader 100. In the illustrated embodiment, the wireless antenna 180 is shown exchanging signals 182 with a remote computing system, the central computing system 300 for the system 50 in which the RFID reader 100 participates.

The RFID reader 100 also comprises one or more feedback devices, such as the audio signal device 190 and the visual signal device 192. Each of the signal devices 190, 192 can be operated by the electronics module 120 to function as desired. For example, the audio signal device 190 can be operated to produce a sound audible to human perception. Some exemplary sounds can include constant sounds, such as a long tone, or patterns of sounds, such as a beeping or intermittent sound in any desired pitch or frequency. In some embodiments, the audio signal device 190 can be used to produce musical tones and/or synthesized voices, or any other sound appropriate to the embodiment. In certain embodiments, the electronics module 120 can be used to store information for use in producing certain audible sounds.

Similarly, the visual signal device 192 can be used to produce visually-perceptible feedback. Thus, in one embodiment, the visual signal device 192 can be a light, whether operated to be constantly illuminated, or intermittently, thereby seen as a flash or strobe. The color or brightness can vary between embodiments. Similarly, multiple light sources can comprise a single visual signal device 192, thus allowing complex patterns of feedback. Thus, in some embodiments, the visual signal device 192 can be present as a light-emitting diode (LED), while in others, a liquid crystal display (LCD), organic LED (OLED), or combination thereof can be used, or other devices as suitable for the embodiment. In other embodiments, different components or devices can be used to alert the user to the location of the RFID reader 100, such as those which provide location information, such as GPS information, or a RFID reader 100 equipped with a camera which can provide a visual image of the surrounding environment.

The central computing system 300 is preferably a computer system adapted to perform the organization and management functions necessary for a distributed RFID inventory system. For use in the system 50, the central computing system 300 is preferably in communication with each RFID device participating in system 50 using wireless communication. The central computing system 300 preferably comprises a display and input/output features sufficient to enable a user to configure the central computing system 300 and each RFID device participating in system 50. Thus, a user can operate the central computing system 300 to display information received from the RFID reader 100, such as a list of RFID tags from which it has received response signals, or, in certain embodiments, a visual map of the store with the inventory of items displayed on the map. A user can also operate the central computing system 300 to transmit signals to the RFID reader 100 instructing it to perform various operations, such as transmitting interrogation signals and/or operating the audio and/or visual signal devices 190, 192. The central computing system 300 can also be used to configure the RFID reader 100 to operate on a particular schedule, as described in greater detail below.

A RFID reader, such as the one described above, preferably is capable of functioning in one or more alternate modes, including the RFID reader mode. The primary functions of the RFID reader need not be limited to data capture and RFID tag interrogation. Rather, the RFID reader can be capable of multi-tasking and multi-functioning. Some functions, such as a bar-code scanner and alternate manual input interfaces, can also be present, though are not illustrated. In some embodiments, the RFID reader 100 can be a single device, while in others, multiple devices can combine various features to accomplish the functions listed above, and others desired for or necessary to the embodiment. A RFID reader, such as the one described above, is preferably used as in conjunction with the systems and methods described below.

Figure 2:
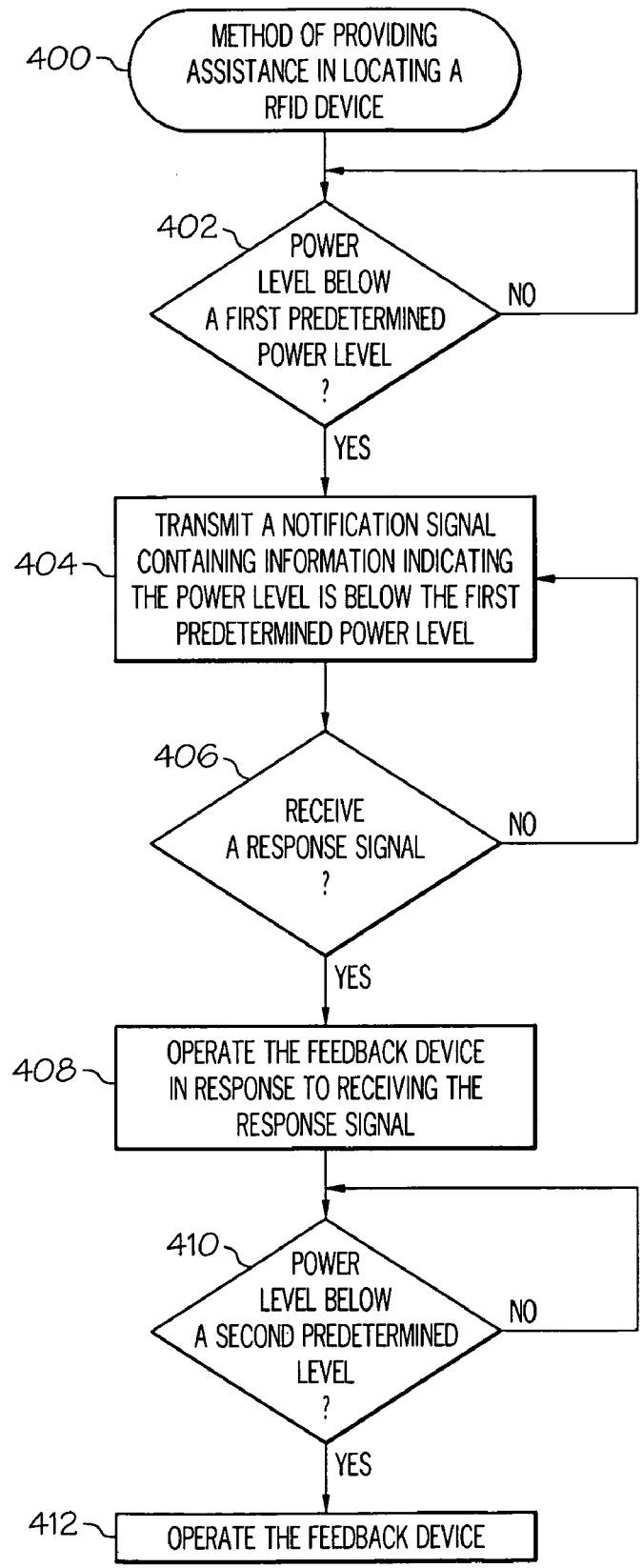
FIG. 2 is a schematic illustration of a method of providing assistance for locating a RFID device.

FIG. 2 is a flow chart which illustrates an embodiment of RFID device locating assistance method 400, which may be performed by an RFID system. The various tasks performed in connection with method 400 may be performed by software, hardware, firmware, or any combination thereof. For illustrative purposes, the following description of method 400 may refer to elements mentioned above in connection with FIG. 1. In embodiments of the invention, portions of method 400 may be performed by different elements of the described system, e.g., an RFID device or a central computing system that is in communication with the RFID device. It should be appreciated that method 400 may include any number of additional or alternative tasks; the task shown in FIG. 2 need not be performed in the illustrated order, and method 400 may be incorporated into a more comprehensive procedure or process having additional functionality not described in detail herein.

FIG. 2 illustrates the steps of a method 400 corresponding to providing assistance to a user of a distributed RFID inventory system 50 in locating a specific device of the system 50 for maintenance. A RFID device of a distributed RFID inventory system may develop a need for maintenance, for example, when approaching depletion of its power source. Although described in the context of the system 50 comprising the RFID reader 100 and central computing system 300, method 400 can be practiced by other systems.

The electronics module 120 can continuously or routinely monitor the power level in the power source 160 (task 402). If it detects that the power level has decreased below the predetermined power level, the electronics module 120 can operate the wireless antenna 180 to transmit a notification signal containing information indicative of the determination (task 404). Such a transmission can be made immediately after determination that the power level is below the predetermined power level, or during scheduled operation of the wireless antenna 180. Preferably, the notification signal is properly formatted and transmitting for reception and interpretation by the central computing system 300. The notification signal can convey the fact of the power level's drop below the predetermined power level in a variety of manners, any of which is acceptable. For example, the notification signal can be transmitted during the normal course of reporting RFID information interrogated from nearby RFID tags. Alternatively, the RFID reader 100 can make a separate transmission solely to communicate the notification signal. In certain embodiments, a standard message from the RFID reader 100 to the central computing system 300 can have a flag portion which the RFID reader 100 can set to a pre-specified position to indicate its low power status. Other embodiments can convey the low power warning to the central computing system 300 in any appropriate manner.

In some embodiments, to conserve power, the RFID reader 100 can operate in scheduled cycles. As one example, to conserve power, the RFID reader 100 might only provide power to, and operate, the RFID antenna 170 every two hours. During operation, the RFID antenna 170 can perform interrogation and receiving tasks appropriate to the function of the distributed RFID inventory system 50 in which it participates. Subsequently, the RFID reader 100 can provide power to the wireless antenna 180 to transmit data obtained during operation of the RFID antenna 170. The RFID reader 100 can also receive instructions during use of the wireless antenna 180. Thereafter, the RFID reader 100 can turn off the RFID and wireless antennas 170, 180 until the next scheduled operation. Although the example of two hours is used, the schedule of active operation of the RFID reader 100 can be configured by the user of the system 50 to any desired schedule. Different RFID devices in the same system can be placed on different schedules if desired. Thus, for those embodiments of the RFID reader 100 where powered operation only occurs during scheduled periods, transmission (task 404) can occur during a regularly-scheduled operation of the wireless antenna 180.

In certain embodiments, the RFID reader 100 can operate the wireless antenna 180 to transmit the signal (task 404) whenever it is determined the power level is below the predetermined power level, regardless of the scheduled operation of the wireless antenna 180. Thus, for purposes of transmission (task 404), the wireless antenna 180 can be provided with power and operated at an unscheduled time.

The central computing system 300 can receive the signal from the RFID reader 100 indicating its power level is below the predetermined power level. The information can be presented to the user using whichever technique the central computing system 300 has been configured to use. For example, the central computing system 300 can be configured to display a message indicating the RFID reader 100 is below the predetermined power level. The message can identify the RFID reader 100 and provide any other useful information. In certain embodiments, the user can operate the central computing system 300 to transmit a response signal to the RFID reader 100, either immediately, or at the next scheduled operation of the wireless antenna 180. In some embodiments, the central computing system 300 can be configured to transmit a response signal without intervention from the user, automatically triggering location assistance. The response signal can instruct the RFID reader 100 to undertake certain operations, such as operating a feedback device, disabling future low-power warnings, altering its operational schedule, and so on.

The RFID reader 100 can monitor transmissions from the central computing system 300 for a response signal (task 406). The response signal immediately, during normal, continuous operation of the wireless antenna 180, or during the next scheduled operation of the wireless antenna 180, depending on the embodiment and operation of the RFID reader 100. Preferably, the response signal contains a command and/or information instructing the RFID reader 100 to operate a feedback device at a particular time, such as the next scheduled operation, or a subsequent scheduled operation, though any designated time can be chosen by the user.

For any of a variety of reasons, the RFID reader 100 may not receive a response signal. For example, the notification signal might not be received by the central computing system 300 due to interference or loss of power. If the RFID reader 100 does not receive a response signal within a predetermined period of time, the length of which can be configured by the user, the RFID reader 100 can re-transmit the notification signal. Such a retransmission can further include information indicating prior transmissions were sent without receiving a response signal. In certain embodiments, the RFID reader 100 can be configured to operate its feedback device(s) in the event a response signal is not received after a specified length of time.

The RFID reader 100 can operate a feedback device, such as the audio or visual signal generators 190, 192, in accordance with instructions contained within the response signal (task 408). Thus, where the response signal instructs the RFID reader 100 to produce feedback at the next scheduled operation, the RFID reader 100 can operate either the audio and/or visual signal generators 190, 192 to produce whatever feedback is desired by the user, such as a beeping or flashing to assist the user, cognizant of the time or feedback production, in locating the particular RFID reader 100 among the plurality comprising the system 50. For example, a beeping sound produced by the RFID reader 100 can assist a user searching for the RFID reader 100 in locating in. Similarly, a flashing light can aid a user in locating the RFID reader 100. The feedback can be produced in any pattern desired and/or configured by the user of the system 50, can preferably can be configured using the central computing system 300. Subsequent to locating the RFID reader 100, the user can perform maintenance on the RFID reader 100, such as by replacing or replenishing the power source 160, which may include use of the power source access 110.

In certain embodiments, the power level may continue to decline without replacement for any number of reasons. If, for example, the user elects to schedule feedback to occur at a distant time in the future after receiving the signal, the power source 160 may become exhausted before feedback is schedule to occur. Accordingly, the RFID reader 100 can continue to detect the power level, and can determine when the power level has decreased below a second, lower predetermined level (task 410). The lower predetermined level can be configured by the user, and can be any desired level, lower than the first predetermined level.

After detecting the power level is below the lower predetermined level (task 410), the RFID reader 100 can alter its operation in several ways, if configured to do so. To conserve the remaining power, the RFID reader 100 can discontinue scheduled operations of the RFID antenna 170. Additionally, the RFID reader 100 can operate the wireless antenna 180 less frequently, or not at all, to conserve power. Finally, the RFID reader can operate one or more feedback devices (task 412) without instruction from the user via the central computing system 300, thereby alerting the user to the location of the RFID reader 100 and, by distinction of not having received an instruction to perform feedback operations, communicate the fact of the power level having decreased below the lower predetermined level. The feedback produced by the audio and/or visual signal devices 190, 192 can be different from that produced in response to receiving the response signal (task 406), allowing a nearby user to discern the relative status of the power level.

After locating the RFID reader 100 using whatever form of assistance has been provided, the user can then perform maintenance operations on the RFID reader 100. For example, as mentioned above, the battery could be changed or recharged to a more desirable, higher power level. Thereafter, the RFID reader 100 can resume normal operations. In the context of method 400, for example, the RFID reader 100 can return to task 402, monitoring its power level for a drop below the predetermined level.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of providing assistance for locating a radio-frequency identification (RFID) device comprising a power source having a power level, and a feedback device, the method comprising:
    determining the power level of the power source is below a first predetermined power level;
    transmitting, from the RFID device, a first signal that indicates the power level of the power source is below the first predetermined power level;
    thereafter, receiving, at the RFID device, a second signal that instructs the RFID device to activate the feedback device;
    operating the feedback device in response to receiving the second signal to generate a first feedback that indicates the power level of the power source is below the first predetermined power level;
    thereafter, determining the power level is below a second predetermined power level, wherein the second predetermined power level is lower than the first predetermined power level; and
    in response to determining the power level is below the second predetermined power level, operating the feedback device to generate a second feedback that indicates the power level of the power source is below the second predetermined power level, wherein the second feedback is different than the first feedback, and wherein operating the feedback device to generate the second feedback is initiated by the RFID device without receiving an instruction to perform feedback operations.

2. The method of claim 1, wherein the RFID device further comprises a wireless transceiver and receiving the second signal comprises periodically providing power to the wireless transceiver.

3. The method of claim 1, wherein the RFID device further comprises an RFID transceiver, and the method further comprises periodically operating the RFID transceiver to interrogate nearby RFID tags.

4. The method of claim 1, wherein operating the feedback device comprises producing a visual signal.

5. The method of claim 1, wherein operating the feedback device comprises producing an audible signal.

6. A method of providing assistance for locating a radio-frequency identification (RFID) device, the RFID device comprising a power source with a power level, and a feedback device, the method comprising:
    determining the power level is below a first predetermined power level;
    transmitting, from the RFID device and in response to the determining step, a first signal that identifies the RFID device and that indicates the power level is below the first predetermined power level in response to the detecting step;
    thereafter, receiving, at the RFID device, a second signal that indicates a time and instructs the RFID device to activate the feedback device;
    operating the feedback device at the time in response to receiving the second signal, to generate a first feedback that indicates the power level is below the first predetermined power level;
    thereafter, determining the power level is below a second predetermined power level, wherein the second predetermined power level is lower than the first predetermined power level; and
    in response to determining the power level is below the second predetermined power level, operating the feedback device to generate a second feedback that indicates the power level of the power source is below the second predetermined power level, wherein the second feedback is different than the first feedback, and wherein operating the feedback device to generate the second feedback is initiated by the RFID device without receiving an instruction to perform feedback operations.

7. The method of claim 6, wherein operating the feedback device comprises operating the feedback device to provide a continuous feedback signal.

8. The method of claim 6, wherein the RFID device further comprises a RFID transceiver and the method further comprises:
    periodically using the RFID transceiver to interrogate nearby RFID tags; and
    discontinuing periodic interrogation with the RFID transceiver in response to determining the power level is below the predetermined power level.

9. The method of claim 6, wherein transmitting the first signal comprises transmitting the first signal using a wireless antenna.

10. The method of claim 6, wherein the feedback device comprises a visual signal generator, and operating the feedback device comprises operating the visual signal generator to produce a flashing light.

11. The method of claim 6, wherein the feedback device comprises an audible signal generator, and operating the feedback device comprises operating the audible signal generator to produce a beeping sound.

12. The method of claim 6, wherein transmitting the first signal includes transmitting information identifying the RFID device and indicating the power level.

13. A radio-frequency identification (RFID) system comprising:
- a RFID device comprising:
  - a power source having a power level;
  - a wireless transceiver adapted to transmit and receive wireless signals;
  - a feedback device adapted to produce a signal perceptible to an operator of the system; and
  - a controller adapted to detect the power level decreasing below a first predetermined power level, to operate the wireless transceiver to transmit a notification signal that indicates the power level is below the first predetermined power level, to receive a response signal, and to operate the feedback device in response to receiving the response signal to generate a first feedback that indicates the power level is below the first predetermined power level; and
- a central computing system adapted to receive the notification signal, to present information indicating the power level is below the first predetermined power level in response to receiving the notification signal to the operator, and to transmit said response signal in response to instructions from the operator;
- wherein the controller is further adapted to determine the power level is below a second predetermined power level that is lower than the first predetermined power level, and to operate the feedback device to generate a second feedback that indicates the power level of the power source is below the second predetermined power level;
- wherein the second feedback is different than the first feedback; and
- wherein operating the feedback device to generate the second feedback is initiated without the RFID device receiving an instruction to perform feedback operations.

14. The RFID system of claim 13, wherein the RFID device further comprises a RFID transceiver, and the controller is adapted to operate the RFID transceiver to interrogate nearby RFID tags.

15. The RFID system of claim 13, wherein the feedback device comprises an audible signal generator.

16. The RFID system of claim 13, wherein the feedback device comprises a visual signal generator.

* * * * *